United States Patent
Müller et al.

(10) Patent No.: US 12,497,346 B2
(45) Date of Patent: Dec. 16, 2025

(54) PROCESS FOR EXTRACTING AROMATIC DICARBOXYLIC ACIDS FROM THEIR METAL SALTS

(71) Applicant: Rittec Umwelttechnik GmbH, Lüneburg (DE)

(72) Inventors: Clemens Müller, Braunschweig (DE); Esther Brepohl, Braunschweig (DE); Lars Biermann, Harsum (DE); Carsten Eichert, Reppenstedt-Dachtmissen (DE); Stephan Scholl, Braunschweig (DE)

(73) Assignee: Rittec Umwelttechnik GmbH, Lüneburg (DE)

( * ) Notice: Subject to any disclaimer, the term of this patent is extended or adjusted under 35 U.S.C. 154(b) by 0 days.

(21) Appl. No.: 18/549,762

(22) PCT Filed: Mar. 4, 2022

(86) PCT No.: PCT/EP2022/055608
§ 371 (c)(1),
(2) Date: Sep. 8, 2023

(87) PCT Pub. No.: WO2022/189302
PCT Pub. Date: Sep. 15, 2022

(65) Prior Publication Data
US 2024/0083833 A1    Mar. 14, 2024

(30) Foreign Application Priority Data
Mar. 11, 2021    (DE) .................... 10 2021 105 970.4

(51) Int. Cl.
*C07C 51/347*    (2006.01)
*C07C 51/43*    (2006.01)

(52) U.S. Cl.
CPC ............ *C07C 51/347* (2013.01); *C07C 51/43* (2013.01)

(58) Field of Classification Search
CPC ....... C07C 51/02; C07C 51/09; C07C 51/347; C07C 51/43; C07C 61/09; C07C 63/15; C07C 63/16; C07C 63/20; C07C 63/26; C07C 63/28; C08G 63/90; C08J 11/04; C08J 2367/02; Y02P 20/143; Y02W 30/62
See application file for complete search history.

(56) References Cited

U.S. PATENT DOCUMENTS

| | | | | |
|---|---|---|---|---|
| 2,841,615 A * | 7/1958 | Schutt | ...................... | C07C 51/02 562/481 |
| 3,029,278 A * | 4/1962 | Spiller, Jr. | .............. | C07C 51/43 562/416 |
| 3,544,622 A * | 12/1970 | England | .................... | C08J 11/16 562/483 |
| 4,345,098 A * | 8/1982 | Schep | ...................... | C07C 51/21 562/407 |
| 4,391,985 A * | 7/1983 | Hook | ....................... | C07C 51/42 562/485 |
| 6,031,128 A | 2/2000 | Roh | | |
| 6,580,005 B1 | 6/2003 | Yazaki | | |
| 2002/0077500 A1* | 6/2002 | Ghatta | .................... | C07C 51/09 562/483 |
| 2006/0252842 A1* | 11/2006 | Gutierrez | ............... | C08G 63/90 241/15 |
| 2021/0253823 A1 | 8/2021 | Eichert | | |

FOREIGN PATENT DOCUMENTS

| | | | |
|---|---|---|---|
| DE | 19534276 A1 | | 3/1997 |
| DE | 102018122210 A1 | | 3/2020 |
| EP | 1215191 A2 | | 6/2002 |
| EP | 1243313 | * | 9/2002 |
| JP | H11 502868 | * | 3/1999 |
| JP | 2005105091 A | | 4/2005 |
| WO | WO 2019/174656 A1 | | 9/2019 |

OTHER PUBLICATIONS

JP H11502868 translated 8 pages (Year: 1999).*
Threeprom et al. (J. of Anal. Chem., vol. 62, No. 12, pp. 1126-1130, Published 2007) (Year: 2007).*
JPH11 502868 translation (Year: 1999).*
Machine translation of Written Opinion from related PCT/EP2022/055608 by Google Translate on Sep. 12, 2023 (pp. 8).
English translation of International Search Report dated Jun. 21, 2022 received in related PCT/EP2022/055608 (pp. 2).
Written Opinion received In related PCT/EP2022/055608 dated Jun. 21, 2022 (pp. 5).
Machine translation of DE19534276A1 on Dec. 19, 2023 by PatDocs PDF Export (pp. 11).
Machine translation of JP2005105091A on Dec. 20, 2023 by PatDocs PDF Export (pp. 26).

* cited by examiner

*Primary Examiner* — Andrew D Kosar
*Assistant Examiner* — Blaine G Doletski
(74) *Attorney, Agent, or Firm* — Woodard Emhardt Henry Reeves & Wagner LLP

(57) ABSTRACT

The present invention relates to a process for extracting aromatic dicarboxylic acids from an outlet stream of a basic depolymerization of polycondensates containing metal carboxylates of the aromatic dicarboxylic acid to be extracted, wherein a mineral or organic acid is added to this outlet stream, the pKs value of which acid being greater than or equal to that of the aromatic dicarboxylic acid, on which the polycondensate is based.

12 Claims, No Drawings

PROCESS FOR EXTRACTING AROMATIC DICARBOXYLIC ACIDS FROM THEIR METAL SALTS

The present invention relates to a method for producing aromatic dicarboxylic acids from the respective metal salts thereof. This method is particularly suitable for use during or after methods that include basic depolymerization, adding metal hydroxides, by way of polycondensates, such as PET, for example, are processed so as to recover the respective monomers for renewed use.

The polycondensates produced, in general, directly from basic chemicals of fossil origin, in particular polyethylene terephthalate (PET) polymers, but also poly(ethylene naphthalates), poly(ethylene terephthalate)-poly(ethylene isophthalate) copolymers, poly(butylene terephthalate)-poly(ethylene terephthalate) copolymers having 1,4-cyclohexane dicarboxylate structural units, are used on a large scale, amongst others, as materials for beverage bottles, food packaging such as salad bowls, cold cuts and cheese packaging, fibers, textiles, automobile parts, and clear, opaque or dyed laundry detergent bottles. For economical and environmental reasons, it is therefore desirable to recover the starting monomers of these polycondensates so as to reuse them. For this purpose, the products produced from these polycondensates, or production waste products, are recycled, in particular by means of alkaline depolymerization, adding alcohols and metal hydroxides such as sodium, potassium, magnesium, calcium and barium hydroxide. After the alkaline depolymerization, the steps of dissolving the metal carboxylates generated during the depolymerization and separating undissolved components and dissolved impurities are carried out in these recycling processes, before the metal carboxylates generated during the depolymerization are precipitated by adding acid. Thereafter, the precipitation product, serving as the raw product, can be purified to obtain the end product.

U.S. Pat. No. 6,580,005 A describes such a recycling process for recovering terephthalic acid in which crushed PET is mixed with polyethylene glycol and sodium carbonate so as to yield metal carboxylate. This is converted into terephthalic acid in several steps, using sulfuric acid, wherein, after the depolymerization, the steps of solid-liquid separation for removing impurities, including the ethylene glycol, neutralizing, including crystallizing, the terephthalic acid, as well as purifying the same by means of washing, solid-liquid separation and drying are carried out.

A process for producing pure terephthalic acid is known from U.S. Pat. No. 6,031,128 A, in which very specific, pure PET plastic waste material is subjected to recycling, wherein, subsequent to the basic depolymerization, by means of NaOH, the resulting slurry is processed by way of solid-liquid separation and further processing of the metal carboxylate dissolved in the separated solvent. For this purpose, the latter, after dilution with no more than three times the required amount of solvent, is conducted through an activated carbon adsorber so as to remove impurities, whereupon a neutralization step and a precipitation step by means of a strong acid, such as HCl, $H_2SO_4$, $HNO_3$, $H_3PO_4$ are carried out. The precipitated wet terephthalic acid is subsequently repeatedly recrystallized in consecutive tanks, in each case at a decreased temperature, so as to obtain larger particles, which can be separated more easily. Thereafter, a cooling step is carried out under reduced pressure, with the end product being obtained after filtration and drying.

However, unsorted waste products can only be processed with difficulty by way of these methods. The basic depolymerization reaction of unsorted waste results in a starting substance mixture for the further method steps which, in addition to the main component of the metal carboxylates in the form of one or more isomers of one monomer or different monomers of the polycondensate to be recycled, includes residues of the added metal hydroxide, dyes, additives, decomposition products, and other impurities from the production, processing and use of these polycondensates. Organic solvents are likewise present, as are in particular the corresponding monomeric alcohols as hydrolysis products of the polycondensates, and ultimately also not fully reacted oligomers and polymers of the polycondensates. Due to the complex and varying composition of this starting substance mixture, this mixture is difficult to process.

It is therefore the object of the invention to provide an accordingly improved method.

This object is achieved by a method according to claim 1, wherein advantageous refinements are described in the dependent claims.

A method according to the invention, including all method steps, takes place as is described in detail hereafter, wherein at least the steps of dissolving and precipitating as well as separating the product are absolutely essential.

In a pre-treatment step according to the invention of the starting substance mixture stemming from the basic depolymerization reaction, only a portion of the minimum amount of solvent required for completely dissolving all of the metal carboxylates contained therein is added, and in particular only the amount that is tailored to the content of the best-soluble isomer of the metal carboxylate—or of the metal carboxylates, in the case of copolymer—so that above all this isomer goes into solution and can thus be separated more easily from the starting substance mixture. This above all advantageously allows the better-soluble isomer or isomers having the highest isomer purity to be available for further processing at a very early point in time of the process in that the solution containing only this isomer is separated, in particular by filtration, from the remaining effluent of the depolymerization, and the filtrate is processed. The separation from the effluent of the depolymerization is preferably carried out by continuous as well as step-by-step filtration apparatuses, in particular belt filters, indexing belt filters, inclined belt filters, melt filters or rotary pressure filters, as well as separation apparatuses that capitalize on the different densities of the solid and liquid suspension components. This results in a liquid phase, which, in addition to the monomeric alcohol-in the case of PET, this being ethylene glycol—as described almost exclusively contains the isomer of the metal carboxylate that is better soluble in the solvent, or the better-soluble isomers, and the solvent, in particular water. During the further processing of this filtrate, the monomeric alcohol is separated from the water, in particular by means of distillation, rectification or membrane processes, such as pervaporation, for example. The separated, better-soluble metal carboxylate remains undissolved in the monomeric alcohol and is subsequently extracted therefrom by way of solid-liquid separation. As an alternative, the step of reactive precipitation described further below may also follow.

In this way, the more poorly soluble isomer in the effluent of the depolymerization is also already purified at the same time. In this way, impurities that could have a dyeing effect on what later will be the aromatic dicarboxylic acid of the more poorly soluble isomer are also advantageously reduced. In the process, according to the invention, the invention tolerates a loss of the other, more poorly soluble monomer or monomers, provided this isomer that is the best-soluble isomer, or more precisely, the dicarboxylic acid thereof, is to be obtained. This dissolution step that, with respect to the total content of metal carboxylates, occurs only for a single isomer is most particularly advantageous since in this way the further metal carboxylates occurring as a result of the copolymers mentioned at the outset are already separated at this early point in time of the process, so that they can either be separately processed or disposed of. According to the invention, this first separation step can already take place by adding an appropriate amount of solvent to the depolymerization reaction itself. The solvent is preferably water or an aqueous solution of a metal sulfate/acetate, such as sodium sulfate or sodium acetate. The aqueous sodium sulfate and acetate solutions can be recirculated to this step from subsequent washing processes of the method according to the invention.

As an alternative to this pretreatment step according to the invention, which deliberately preferably only separates a single isomer, at least so much solvent is added to the starting substance mixture, with the procedure otherwise remaining the same, that the metal carboxylate isomer mixture is present in fully dissolved form. For dissolving disodium terephthalate, a metal carboxylate, at 20° C., at least one liter of water per 130 g disodium terephthalate is required. From an apparatus point of view, the dissolution process is advantageously carried out in an agitator vessel, a static mixer or by a rotor-stator shear apparatus (inline disperser).

In this alternative step, it is also possible according to the invention to directly add a defined amount of the acid that is used, in a subsequent method step of precipitation crystallization, in a precipitating agent to the starting substance mixture, in addition to the addition of solvent-including in the form of an aqueous sulfate/acetate solution. The amount of acid to be used at this point in time of the process is selected according to the invention in such a way that a metal hydroxide excess is neutralized, however no aromatic dicarboxylic acid is crystallized yet. This advantageously reduces discolorations, which decrease the quality of the product later on. It likewise advantageously reduces the corrosion of downstream equipment components, and advantageously prepares the starting substance mixtures for a downstream purification, for example by adsorptive methods.

In a step of separating undissolved impurities, which follows the dissolution step, the suspension of undissolved components obtained in the last step is separated by means of solid-liquid separation. For this purpose, continuous and step-by-step methods, such as inertia-based methods, for example swim-sink separation, and filtration methods are employed. When filtration methods are used, these preferably have a multi-stage design, typically having 2 to 8 stages, and a decreasing separation size from, for example, 150 μm to an absolute separation size of 0.5 μm. The filtration is preferably carried out at temperatures below 30° C. so as to separate even poorly soluble substances that would otherwise go into solution. According to the invention, it is also possible to separate very fine solid particles by way of flocculation using flocculating agents, such as polyamines, sodium aluminates, magnesium chloride, iron sulfate and others to form large agglomerates so that the solid-liquid separation becomes easier and more efficient.

The liquid phase obtained in this way is thereafter subjected to a step of separating dissolved impurities, such as soluble dyes, UV stabilizers, additives, and many others, wherein according to the invention the dissolved impurities are separated by adsorption on, for example, activated carbon, zeolites, iron hydroxide oxide or by extraction methods. The activated carbon selected is one that has low affinity for the dissolved metal carboxylates so as to avoid product losses. Moreover, the pH value is adapted by adding an acid, this preferably being the acid used later as a precipitating agent, possibly to improve the purification process. If extraction methods are employed, either the undesirable impurities or the metal carboxylates are transferred into the extract phase. Extracting agents that can be employed either have as low an affinity as possible for the dicarboxylic acid or a particularly high affinity for the selective production of the dicarboxylic acid. It is preferred to separate the impurities so as to leave the metal carboxylates in the aqueous medium.

According to the invention, the step of separating dissolved impurities is followed by a step of reactive precipitation by adding an acid. The metal carboxylate or carboxylates present in the purified solution is or are displaced by the acid from the salts thereof and react to form the respective dicarboxylic acid, which precipitates from the solution.

By selecting an acid having very specific properties, this particularly important step according to the invention results in the precipitation of an aromatic dicarboxylic acid having optimized properties in terms of particle size and color, which considerably improves the processability thereof with respect to filtrability, washability, bulk density and flow properties of the mixture with monomeric alcohols. Moreover, a particularly pure dicarboxylic acid is thus obtained, since the acid according to the invention reacts selectively with the metal carboxylates of the more poorly soluble aromatic dicarboxylic acid, and the further metal carboxylates of the better-soluble aromatic dicarboxylic acids which are possibly present in the solution are only precipitated to a small degree by the acid according to the invention. In other words, the better-soluble isomers, these being phthalic acid and isophthalic acid, are precipitated to a considerably lesser degree by the acid according to the invention, based on the example of mixtures of benzenedicarboxylic acids, while the more poorly soluble terephthalic acid is precipitated to a high degree.

If, according to the invention, in the first step of the pre-treatment only so little solvent is used that the best-soluble isomer is primarily present in the solution and was separated, it is also primarily only this isomer that can precipitate from the solution thereof.

In addition to the use, according to the invention, of an acid having at least a higher pKa value, the particular process parameters of the precipitation process also contribute to an aromatic dicarboxylic acid being obtained that is highly pure and has optimal physical properties. These are, in particular, a process temperature between 50° C. and 100° C., which surprisingly allows larger aromatic dicarboxylic acid crystals, and in particular terephthalic acid crystals, to be created than a higher temperature, in particular crystals up to 10 times larger. Larger dicarboxylic acid crystals, in particular terephthalic acid crystals, allow a more effective and more rapid solid-liquid separation. At the same time, adding acid at these temperatures, and in particular at 80° C. to 95° C., decreases crystal discoloration. Finally, this process temperature, based on the example of the isomers of terephthalic acid, also results in an equilibrium in the crystallisate between terephthalic acid and isophthalic acid which is considerably shifted toward terephthalic acid, if isophthalic acid has remained in the solution. The ratio of terephthalic acid to isophthalic acid is at least 3:1.

According to the invention, an acid is used having a pKa value that is greater than that of the more poorly soluble aromatic dicarboxylic acid, and in particular of terephthalic acid. It therefore came as a surprise to the applicant that such a weak acid is not just suitable for the precipitation reaction, but even particularly well-suited, since it results in a terephthalic acid crystallisate having a particularly advantageous size for further processing. The ethanoic acid used according to the invention in particular for the precipitation reaction has a pKa value of 4.76, and thus a lower acidity than terephthalic acid, which has a pKa1 value of 3.54 and a pKa2 value of 4.46. The use and the manner of the metered addition of ethanoic acid to the solution of metal carboxylates of different benzenedicarboxylic acids also results in the fact that the more poorly soluble acid, for example terephthalic acid compared to isophthalic acid, is obtained in a targeted manner from the salt thereof in a substantially selective process. Sulfuric acid, which is typically used in the prior art, in contrast, results in a higher yield of terephthalic acid, possibly however in a mixture with isophthalic acid, with equimolar addition based on the number of available and required functional acid groups. In other words, the invention tolerates a poorer overall isomer yield compared to the use of sulfuric acid, which enables a yield of up to 99.9%, in order to obtain a product of a single dicarboxylic acid isomer which is purer and can be processed more easily. The reduction in the yield can be as much as 20%.

The concentration of the acid in the precipitating agent is generally between 1% and 100%. According to the invention, the precipitation can also be carried out at a temperature between 100° C. and 200° C. and appropriate vapor pressure. By subsequently cooling the resulting suspension in a suitable manner, crystals of the aromatic dicarboxylic acid are obtained, which, in terms of the size and morphology thereof, are suitable for direct use in conventional industrial processes for polymerization, for example of terephthalic acid for producing PET.

In a step, following the precipitation, of solid-liquid separation and washing of the precipitation product and the product of the recrystallization process, the suspension of crystals stemming from the reactive precipitation or a recrystallization process is subjected to a solid-liquid separation so as to separate the aromatic dicarboxylic acid from the mother liquor thereof. For this purpose, apparatuses operated continuously and step by step are used for the solid-liquid separation, such as belt filters, indexing belt filters, rotary drum filters, filter presses, Nutsche filters, bag filters, candle filters, sieve filters, decanter worm centrifuges or disk separators. The mother liquor obtained prior to washing is optionally collected separately and, in part or completely, used as a solvent for the original starting substance mixture, as described at the outset. The use of continuously operating filtration apparatuses such as belt, indexing belt or rotary drum filters allows the moist filter cake to be washed directly using a washing medium, preferably water.

According to the invention, an optional post-treatment step in the form of recrystallization of the precipitated dicarboxylic acids or the mixture of dicarboxylic acids can follow. In this step, the crystals obtained from the reactive precipitation are optimized by recrystallization in terms of purity and morphological properties. The renewed dissolution of the precipitated aromatic dicarboxylic acid in a solvent, with subsequent crystallization, causes the impurities trapped in the crystal to be released. As a function of the temperature-dependent solubility behavior of the target dicarboxylic acid, cooling, evaporation or flash crystallization methods are employed. The entire recrystallization is carried out step by step or continuously, in one stage or in 2 to 6 stages, with the temperature decreasing in each stage starting from an initial maximum dissolution temperature, wherein continuous recrystallization is preferred. When water is used as the solvent for the recrystallization of terephthalic acid, temperatures from 180° C. to 280° C. are advantageous at appropriate vapor pressures for dissolution. In contrast to conventional purification and crystallization methods of industrial production processes of highly pure aromatic dicarboxylic acids, it is very advantageously not necessary according to the invention to select a temperature and concentration at which all resuspended crystals are completely dissolved, since the aromatic dicarboxylic acid stemming from the depolymerization process does not include the typical impurities of conventional production methods of aromatic dicarboxylic acids. This advantageously reduces the process costs and duration. The release of foreign material and the morphological adaptation are dynamic processes that can also be based on crystal maturation processes. This dynamic dissolution and crystallization process can range between 5 min and 300 min, depending on the required purity. Solid-liquid separation and washing of the crystallisate are carried out analogously to the above-described manner.

Finally, it is provided that the washed and mechanically dehumidified crystallisate is dried. For this purpose, different step-by-step and continuous drying apparatuses are employed, such as fluidized bed dryers, belt dryers, paddle dryers, spray dryers or freeze dryers. The drying process is carried out in 1 to 4 stages.

EXEMPLARY EMBODIMENT 1

A pasty mixture made up of 124.5 g disodium terephthalate, 1.9 g disodium isophthalate, 2.4 g sodium hydroxide, 37.3 g ethylene glycol, 2.1 g polyethylene terephthalate flakes and 3.9 g polyethylene flakes from the alkaline ester hydrolysis of a PET/PE multilayer packaging material was mixed with 1000 g deionized water. At 20° C., the salts of the aromatic dicarboxylic acids dissolve completely, resulting in a suspension of PE flakes with PET residues having a pH value of 13.4. This suspension was filtered by means of a wedge wire screen having a slot width of 150 μm, and subsequently by means of a sieve filter having a mesh size of 50 μm. In this way, it was possible to remove 95% by weight of the undissolved polymer components of the suspension. 99.9% by weight of the remaining undissolved components was removed by subsequent microfiltration by means of a polypropylene absolute rated filter candle having a grade of filtration of 1 μm. The resultant clear solution was adjusted to a pH value of 9.8 while stirring by adding 11 mL 25% acetic acid. Only the sodium hydroxide that is present is neutralized to yield sodium acetate. Thereafter, 13.8 g activated carbon granules having a lower affinity for the present aromatic dicarboxylic acids was added to this slightly yellowish solution, and the suspension was heated to 75° C. while stirring. Following a residence time of 50 min, the activated carbon was removed from the now colorless solution by means of filtration, and the solution was charged into a 1.5 L glass flask. There, the solution was heated to 80° C. and thereafter was mixed with 162.7 g 80% acetic acid via a peristaltic pump comprising a dosing pipe. The amount used corresponds to a stoichiometry factor of 3.6, based on the total resulting substance amount of aromatic dicarboxylic acids and precipitates 95% by weight thereof. The tip of the dosing pipe, in terms of the apparatus, was located directly above the paddles of the propeller agitator used so as to ensure optimal mixing of the reaction medium. The dosing duration was 70 min, and the subsequent stirring duration was 50 min at 300 rpm. Thereafter, the suspension was cooled to 30° C., filtered by means of a vacuum Nutsche filter, and washed in two stages, using 200 ml deionized water in each case. The isophthalic acid content of the resulting crystallisate was 0.2% by weight (1.5% by weight in the starting substance), as ascertained by HPLC measurement using a UV-Vis detector.

30 g of the moist crystallisate having a residual moisture of 20% by weight was turned into a slurry with 394 g deionized water and charged into a stirred 500 mL pressurized reactor. The suspension was heated to 210° C. at 300 rpm and an accordingly resulting vapor pressure of 18.5 bar. The residence time at 210° C. was 60 min. Under the aforementioned process conditions, approximately 10 g of the resulting 24 g crystallisate is dissolved. Thereafter, the suspension was gradually cooled within 90 min to ambient temperature. After renewed filtration by means of a vacuum Nutsche filter and subsequent washing, the crystallisate was dried at 85° C. for 10 h. The quality of the crystallisate thus obtained can only be achieved by way of the above-described method. It meets the requirements with regard to terephthalic acid for use in industrial plants for producing polycondensates. In terms of the flow properties, in suspensions with ethylene glycol in molar ratios from 1:1.1 to 1:1.15, it reaches viscosities of <5 Pa·s at 24° C. With respect to the product purity, a tristimulus value of <10° H is achieved.

EXEMPLARY EMBODIMENT 2

A pasty mixture made up of 121.3 g disodium terephthalate, 6.3 g disodium isophthalate, 2.4 g sodium hydroxide, 37.4 g ethylene glycol, 2.1 g polyethylene terephthalate flakes and 1.2 g polyethylene terephthalate flakes from the alkaline ester hydrolysis of a PET post-consumer packaging material was mixed with 1,000 g deionized water. At 20° C., the salts of the aromatic dicarboxylic acids dissolved completely, resulting in a suspension of PET flakes having a pH value of 13.4. This suspension was filtered by means of a filter cloth having a grade of filtration of 5-10 μm. In the process, 98% by weight of the undissolved polymer components of the suspension was removed. 99.9% by weight of the remaining undissolved components was removed by way of subsequent microfiltration by means of a polypropylene absolute rated filter candle having a degree of filtration of 1 μm. The ultrafine clarification until a degree of filtration of 50 nm was reached was carried out in a downstream polyether sulfone membrane filter candle. The resultant clear solution was adjusted to a pH value of 8.9 while stirring by adding 12.5 mL 25% citric acid. Only the sodium hydroxide that was present was neutralized, resulting in the formation of sodium citrate. Thereafter, 14 g activated carbon granules having a lower affinity for the present aromatic dicarboxylic acids was added to this slightly yellowish solution, and the suspension was heated to 60° C. while stirring. After 60 min, the activated carbon was removed from the now colorless solution by means of filtration, and the solution was charged into a 1.5 L glass flask. There, the solution was heated to 65° C., and thereafter was mixed with 617 g of a 25% citric acid via a peristaltic pump comprising a dosing pipe, corresponding to a stoichiometry factor 1.33 based on the total present substance amount of aromatic dicarboxylic acids. This caused 92% by weight of the aromatic dicarboxylic acids contained therein to precipitate. The isophthalic acid content of the resulting precipitate was 2.8% by weight (at 5% by weight in the starting substance), as ascertained by HPLC measurement using a UV-Vis detector.

All further steps followed analogously to Exemplary Embodiment 1.

EXEMPLARY EMBODIMENT 3

The particle-free and colorless solution from Exemplary Embodiment 2 was heated to 65° C. and mixed, in a stirred 1.5 L glass reactor, with 472.3 g 25% ortho-phosporic acid, consequently at a stoichiometry factor of 2. In the process, 87% by weight of the aromatic dicarboxylic acids contained therein precipitated. The isophthalic acid content of the resulting precipitate was 2.7% by weight (at 5% by weight in the starting substance, as ascertained by HPLC measurement using a UV-Vis detector.

The method according to the invention for producing aromatic dicarboxylic acids from the metal carboxylates thereof, using an acid that, compared to the dicarboxylic acids, is weaker or at the most equally acidic, in the precipitating agent, surprisingly results in a highly pure product that is optimized, in terms of the physical properties thereof, for the use later on in polymerization reactions, to which an optional step of a step of separating a better-soluble metal carboxylate isomer carried out early during the course of the method.

The invention claimed is:

1. A method for producing isophthalic acid and terephthalic acid from an effluent of a basic depolymerization reaction of polycondensates comprising metal carboxylates of isophthalic acid and of terephthalic acid, comprising the steps of:
   a) dissolving the metal carboxylates of isophthalic acid and terephthalic acid in the effluent; and
   b) carrying out a reactive precipitation by adding a mineral and/or organic acid to the effluent, wherein the added mineral acid or organic acid has at least a pKA value that is greater than or equal to the pKA values of the terephthalic acid, wherein the reactive precipitation is carried out at a temperature between 50° C. and 200° C., and wherein the mineral and/or organic acid is added in an amount corresponding to a stoichiometry factor of 1.33 to 3.6 based on the total present substance amount of isophthalic acid and terephthalic acid in the effluent, to receive a precipitated mixture of terephthalic acid and isophthalic acid, and wherein the precipitated mixture has an isophthalic acid content that is reduced by 44% to 87% by weight compared to the isophthalic acid content of the mixture of the effluent.

2. The method according to claim 1, further comprising:
c) separating the precipitated dicarboxylic acid.

3. The method according to claim 2, further comprising one or more of the following steps: separating solid impurities of the effluent; separating liquid and/or dissolved impurities of the effluent; and purifying the precipitated dicarboxylic acid.

4. The method according to claim 3, wherein the step of purifying the precipitated dicarboxylic acid is performed by way of recrystallization of the precipitated dicarboxylic acid at temperatures between 180° C. and 280° C., and wherein the recrystallization is carried out in such a way that not all of the precipitated dicarboxylic acid is dissolved.

5. The method according claim 1, wherein the mineral or organic acid comprises ethanoic acid.

6. The method according to claim 1, wherein the mineral or organic acid is added directly to the effluent solution via a dosing pipe, having its tip located directly above agitator paddles of an agitator.

7. The method according to claim 1, wherein all method steps are carried out continuously.

8. The method according to claim 2, furthermore comprising the following steps: separating solid impurities of the effluent; separating liquid and/or dissolved impurities of the effluent; and purifying the precipitated dicarboxylic acid.

9. The method according to claim 8, wherein the step of purifying the precipitated dicarboxylic acid is performed by way of recrystallization of the precipitated dicarboxylic acid at temperatures between 180° C. and 280° C., and wherein the recrystallization is carried out in such a way that not all of the precipitated dicarboxylic acid is dissolved.

10. The method according claim 9, wherein the mineral or organic acid comprises ethanoic acid.

11. The method according to claim 10, wherein the mineral or organic acid is added directly to the effluent solution via a dosing pipe, having its tip located directly above agitator paddles of an agitator.

12. The method according to claim 11, wherein all method steps are carried out continuously.

* * * * *